United States Patent
Blankenship et al.

(10) Patent No.: US 11,825,473 B2
(45) Date of Patent: *Nov. 21, 2023

(54) COMMON SEARCH SPACE (CSS) FOR PAGING OF NB-IOT DEVICES

(71) Applicant: TELEFONAKTIEBOLAGET LM ERICSSON (PUBL), Stockholm (SE)

(72) Inventors: Yufei Blankenship, Kildeer, IL (US); Yutao Sui, Solna (SE); Yi-Pin Eric Wang, Fremont, CA (US); Asbjörn Grövlen, Stockholm (SE); Hazhir Shokri Razaghi, Kista (SE); Xingqin Lin, San Jose, CA (US); Ansuman Adhikary, Santa Clara, CA (US); Johan Bergman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,377

(22) Filed: Feb. 19, 2020

(65) Prior Publication Data

US 2020/0260429 A1    Aug. 13, 2020

Related U.S. Application Data

(63) Continuation of application No. 15/544,390, filed as application No. PCT/IB2017/050167 on Jan. 12, 2017, now Pat. No. 10,609,686.

(Continued)

(51) Int. Cl.
*H04W 72/04* (2023.01)
*H04W 72/20* (2023.01)
(Continued)

(52) U.S. Cl.
CPC ........... *H04W 72/20* (2023.01); *H04L 5/0053* (2013.01); *H04L 67/12* (2013.01); *H04W 72/30* (2023.01); *H04L 5/001* (2013.01); *H04W 88/02* (2013.01)

(58) Field of Classification Search
CPC ............. H04W 72/04; H04W 72/0406; H04W 72/005; H04W 88/02; H04W 68/005;
(Continued)

(56) References Cited

U.S. PATENT DOCUMENTS 10,721,775 B2 *  7/2020  Park ................. H04W 52/0216
2012/0120910 A1   5/2012  Mazzarese et al.
(Continued)

FOREIGN PATENT DOCUMENTS

CN    101513104 A    8/2009
CN    102884752 A    1/2013
(Continued)

OTHER PUBLICATIONS

Intel Corporation: "Common control message transmission for NB-IoT", 3GPP Draft; R1-160418-Intel NB-IOT COMMCTRL, 3rd Generation Partnership Project (3GPP), Mobile Competence Centre; 650, Route Des Lucioles; F-06921 Sophia-Antipolis Cedex ; France, val. RAN WG1, No. St Julian's, Malta.
(Continued)

Primary Examiner — John D Blanton

(57) ABSTRACT

A method performed by a user equipment (UE) in idle mode, for determining common search space (CSS) for NB-IoT paging is disclosed. The method comprises determining a set of periodic subframes as a Paging Occasion (PO) subframe pattern. The method further comprises monitoring a starting subframe of paging CSS for a Radio Network Temporary Identifier (RNTI). The starting subframe of paging CSS is determined as follows: a first subframe (SF0) defined by the
(Continued)

Paging Occasion subframe pattern, is used when SF0 is determined to be a valid downlink subframe. A next valid downlink subframe after SF0 is used when SF0 is determined to be an invalid downlink subframe.

24 Claims, 4 Drawing Sheets

Related U.S. Application Data

(60) Provisional application No. 62/309,177, filed on Mar. 16, 2016.

(51) Int. Cl.
*H04L 5/00* (2006.01)
*H04W 72/30* (2023.01)
*H04L 67/12* (2022.01)
*H04W 88/02* (2009.01)

(58) Field of Classification Search
CPC .... H04W 72/20; H04W 72/30; H04L 5/0053; H04L 67/12; H04L 5/001
See application file for complete search history.

(56) References Cited

U.S. PATENT DOCUMENTS

| | | | | |
|---|---|---|---|---|
| 2012/0122495 | A1* | 5/2012 | Weng | H04W 68/025 455/458 |
| 2012/0281566 | A1* | 11/2012 | Pelletier | H04W 76/27 370/252 |
| 2014/0016598 | A1 | 1/2014 | Kwon et al. | |
| 2017/0013391 | A1* | 1/2017 | Rico Alvarino | H04W 72/0446 |
| 2018/0302878 | A1 | 10/2018 | Byun et al. | |
| 2018/0324654 | A1 | 11/2018 | Chincholi et al. | |

FOREIGN PATENT DOCUMENTS

| | | |
|---|---|---|
| CN | 103748936 A | 4/2014 |
| CN | 104349333 A | 2/2015 |
| CN | 104969493 A | 10/2015 |
| RU | 2562827 C2 | 9/2015 |
| RU | 2562827 C9 | 11/2015 |
| WO | 2011133647 A2 | 10/2011 |

OTHER PUBLICATIONS

Nokia Networks: "36.304 running CR to capture agreements on NBIoT", 3GPP Draft; R2-162071-36.304 Running CR to Capture Agreements on NB-IOT, 3rd Generation Partnership Project (3GPP), Mobile Competence Centre ; 650, Route Des Lucioles ; F-06921 Sophia-Antipolis Cedex, vol. RAN WG2, No. St. Julian, Malta.

Intel Corporation: "Remaining open aspects on NBIOT Paging", 3GPP Draft; R2-161258_NB-IOT_PAGING_INTELV01, 3rd Generation Partnership Project (3GPP), Mobile Competence Centre ; 650, Route Des Lucioles ; F-06921 Sophia-Antipolis Cedex; France, val. RAN WG2, No. St Julian, Malta.

3GPP TS 36.211 V14.0.0.

Ericsson, Remaining paging issues for BL UEs and UEs in EC [online], 3GPP TSG-RAN WG2#93 R2-161692.

Media Tek Inc., "Paging Enhancements", 3GPP TSG RAN WG2 Meeting #93, R2-161461, St. Julian's, Malta, Feb. 15-19, 2016.

* cited by examiner

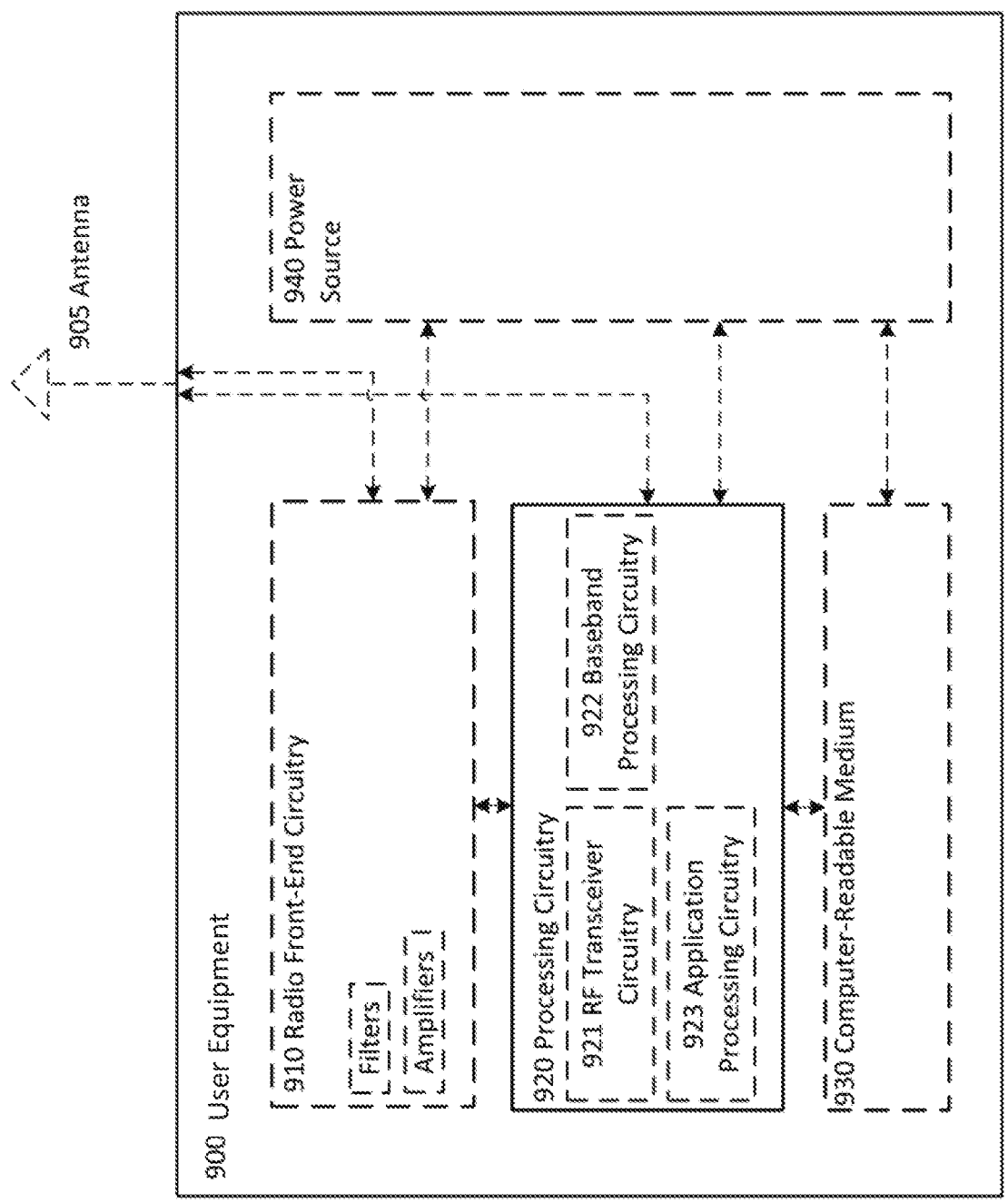

COMMON SEARCH SPACE (CSS) FOR PAGING OF NB-IOT DEVICES

TECHNICAL FIELD

This disclosure relates, in general, to wireless communications, and more specifically, to determining common search space (CSS for paging of Narrowband Internet of Things (NB-IoT) systems and devices.

BACKGROUND

Narrow Band Internet of Things (NB-IoT) is a narrowband (180 KHz bandwidth) system being developed for the cellular internet of things by 3GPP. The system is based on LTE systems and addresses optimized network architecture and improved indoor coverage for a massive number of devices with any one or more of the following characteristics:
  low throughput devices (e.g., 2 Kbps)
  low delay sensitivity (e.g., ~10 seconds)
  ultra-low device cost (e.g., below 5 dollars)
  low device power consumption (e.g., battery life of 10 years)

It is envisioned that each cell (e.g., ~1 km$^2$) in this system will serve thousands (e.g., ~50 thousand) of wireless devices such as sensors, meters, actuators, etc. It is imperative that this system can provide good coverage for its devices, which often are located deep indoors e.g. underground in basements, or even built into walls of a building and with limited or no possibility for battery charging. Although many different types of devices are envisioned, for the sake of simplicity they will be referred to as wireless devices (WDs) or user equipments (UEs) throughout this document.

In order to make it possible to deploy NB-IoT using only one refarmed GSM carrier and support lower manufacturing costs for NB-IoT UEs, the bandwidth has been reduced to one physical resource block (PRB) of size 180 KHz divided into several subcarriers.

For frequency division duplex or FDD (i.e. the transmitter and the receiver operate at different carrier frequencies), only half-duplex mode needs to be supported in the UE. The lower complexity of the devices (e.g., only one transmission/receiver chain) means that some repetition might be needed also in normal coverage. Further, to alleviate UE complexity, the working assumption is to have cross-subframe scheduling. That is, a transmission is first scheduled on an Enhanced Physical DL Control Channel (E-PDCCH, also known as NB-PDCCH) and then the first transmission of the actual data on the Physical DL Shared Channel (PDSCH) is carried out after the final transmission of the NB-PDCCH. Similarly, for uplink (UL) data transmission, information about resources scheduled by the network and needed by the UE for UL transmission is first conveyed on the NB-PDCCH, and then the first transmission of the actual data by the UE on the Physical UL Shared Channel (PUSCH) is carried out after the final transmission of the NB-PDCCH. In other words, for both cases above, there is no simultaneous reception of control channel and reception/transmission of data channel from the UE's perspective.

The following text is an excerpt from section 7 of 3GPP TS 36.304, the entirety of which is herein incorporated by reference:
  7. Paging
  7.1 Discontinuous Reception for paging
  The UE may use Discontinuous Reception (DRX) in idle mode in order to reduce power consumption. One Paging Occasion (PO) is a subframe where there may be P-RNTI transmitted on PDCCH addressing the paging message. One Paging Frame (PF) is one Radio Frame, which may contain one or multiple Paging Occasion(s). When DRX is used the UE needs only to monitor one PO per DRX cycle.
PF and PO is determined by following formulae using the DRX parameters provided in System Information:
PF is given by following equation:

$SFN \bmod T=(T \, div \, N)*(UE\_ID \bmod N)$

Index i_s pointing to PO from subframe pattern defined below will be derived from following calculation:

$i\_s = \text{floor}(UE\_ID/N) \bmod Ns$

System Information DRX parameters stored in the UE shall be updated locally in the UE whenever the DRX parameter values are changed in SI. If the UE has no IMSI, for instance when making an emergency call without USIM, the UE shall use as default identity UE_ID=0 in the PF and i_s formulas above.
The following Parameters are used for the calculation of the PF and i_s:
  T: DRX cycle of the UE. T is determined by the shortest of the UE specific DRX value, if allocated by upper layers, and a default DRX value broadcast in system information. If UE specific DRX is not configured by upper layers, the default value is applied.
  nB: 4T, 2T, T, T/2, T/4, T/8, T/16, T/32.
  N: min(T,nB)
  Ns: max(1,nB/T)
  UE_ID: IMSI mod 1024.
IMSI is given as sequence of digits of type Integer (0 . . . 9), IMSI shall in the formulae above be interpreted as a decimal integer number, where the first digit given in the sequence represents the highest order digit.
For example:
  IMSI=12(digit1=1, digit2=2)
In the calculations, this shall be interpreted as the decimal integer "12", not "1×16+2=18".
7.2 Subframe Patterns
FDD:

TABLE 0-1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TDD (all UL/DL configurations):

TABLE 0-2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

SUMMARY

As can be seen from the excerpt above, the current approach provides inadequate paging opportunities for NB- IoT UEs (e.g., zero or limited number of paging occasions). Thus, this provides limited or inadequate opportunities for NB-IoT UEs to adequately communicate.

In this disclosure, we propose methods and apparatuses to address these issues by determining paging occasion (PO), paging frame (PF), and common search space (CSS) for NB-IoT UE. This provides more adequate opportunities for NB-IoT devices to communicate.

Various embodiments are disclosed herein for monitoring, aligning, modifying, and/or assigning paging occasions and/ or paging frames for NB-IoT UEs. According to particular embodiments methods and apparatuses are disclosed for use when subframes are occupied by other broadcast channels or signals. According to additional embodiments, methods and apparatuses are disclosed for inband operation. According to additional embodiments, methods and apparatuses are disclosed for standalone or guard band operation. According to additional embodiments, methods and apparatuses are disclosed for determining paging CSS using valid subframe pattern without changing PO subframe pattern. The various methods described herein may be performed by a wireless device, a UE, a network node, or some suitable combination of apparatuses.

A method performed by a wireless device is disclosed. The method comprises determining a set of periodic subframes as a Paging Occasion (PO) subframe pattern and monitoring a starting subframe of paging CSS for a Radio Network Temporary Identifier (RNTI). The starting subframe of paging CSS is determined as follows: (i) a first subframe (SF0), defined by the Paging Occasion subframe pattern, is used when SF0 is determined to be a valid downlink subframe; and (ii) a next valid downlink subframe after SF0 is used when SF0 is determined to be an invalid downlink subframe.

In some embodiments, the subframe is determined to be a valid downlink subframe if the subframe is indicated as a valid downlink subframe in a Narrowband System Information Block 1 (NB-SIB1) and the subframe does not include any of the following: NPSS, NSSS, NPBCH, and NB-SIB1.

Also disclosed is a wireless device. The wireless device comprises processing circuitry configured to determine a set of periodic subframes as a Paging Occasion (PO) subframe pattern and monitor a starting subframe of paging CSS for a Radio Network Temporary Identifier (RNTI). The starting subframe of paging CSS is determined as follows: (i) a first subframe (SF0), defined by the Paging Occasion subframe pattern, is used when SF0 is determined to be a valid downlink subframe; and (ii) a next valid downlink subframe after SF0 is used when SF0 is determined to be an invalid downlink subframe. The wireless device may further comprise power supply circuitry configured to supply power to the wireless device.

In some embodiments, the subframe is determined to be a valid downlink subframe if the subframe is indicated as a valid downlink subframe in a Narrowband System Information Block 1 (NB-SIB1) and the subframe does not include any of the following: NPSS, NSSS, NPBCH, and NB-SIB1.

A user equipment, UE, for determining common search space (CSS) for NB-IoT paging while operating in idle mode is also disclosed. The UE comprises an antenna configured to send and receive wireless signals. The UE further comprises radio front-end circuitry connected to the antenna and to processing circuitry, and configured to condition signals communicated between the antenna and the processing circuitry. The processing circuitry is configured to determine a set of periodic subframes as a Paging Occasion (PO) subframe pattern and monitor a starting subframe of paging CSS for a Radio Network Temporary Identifier (RNTI). The starting subframe of paging CSS is determined as follows: (i) a first subframe (SF0), defined by the Paging Occasion subframe pattern, is used when SF0 is determined to be a valid downlink subframe; and (ii) a next valid downlink subframe after SF0 is used when SF0 is determined to be an invalid downlink subframe. The user equipment further comprises an input interface connected to the processing circuitry and configured to allow input of information into the UE to be processed by the processing circuitry, and an output interface connected to the processing circuitry and configured to output information from the UE that has been processed by the processing circuitry. Yet further, the user equipment comprises a battery connected to the processing circuitry and configured to supply power to the UE.

In some embodiments, the subframe is determined to be a valid downlink subframe if the subframe is indicated as a valid downlink subframe in a Narrowband System Information Block 1 (NB-SIB1) and the subframe does not include any of the following: NPSS, NSSS, NPBCH, and NB-SIB1.

A method performed by a network node is also disclosed. The method comprises determining a set of periodic subframes as a Paging Occasion (PO) subframe pattern and transmitting a paging message to a User Equipment (UE), the paging message beginning with a starting subframe of paging CSS. The starting subframe of paging CSS is determined as follows: (i) a first subframe (SF0), defined by the Paging Occasion subframe pattern, is used when SF0 is determined to be a valid downlink subframe; and (ii) a next valid downlink subframe after SF0 is used when SF0 is determined to be an invalid downlink subframe.

In some embodiments, the network node indicates a subframe as a valid downlink subframe in a Narrowband System Information Block 1 (NB-SIB1). The network node determines the subframe is a valid downlink subframe if the subframe does not contain any of the following: NPSS, NSSS, NPBCH, and NB-SIB1.

A network node for determining common search space (CSS) for NB-IoT paging is also disclosed. The network node includes processing circuitry configured to determine a set of periodic subframes as a Paging Occasion (PO) subframe pattern and transmit a paging message to a User Equipment (UE), the paging message beginning with a starting subframe of paging CSS. The starting subframe of paging CSS is determined as follows: (i) a first subframe (SF0), defined by the Paging Occasion subframe pattern, is used when SF0 is determined to be a valid downlink subframe; and (ii) a next valid downlink subframe after SF0 is used when SF0 is determined to be an invalid downlink subframe.

In some embodiments, the network node indicates a subframe as a valid downlink subframe in a Narrowband System Information Block 1 (NB-SIB1). The network node determines the subframe is a valid downlink subframe if the subframe does not contain any of the following: NPSS, NSSS, NPBCH, and NB-SIB1.

Certain embodiments of the present disclosure may provide one or more technical advantages. For example, some embodiments may advantageously provide more adequate opportunities for NB-IoT devices to communicate. Some embodiments allow the NB-IoT transmission to flexibly adapt to the valid downlink subframe pattern. Some embodiments advantageously provide the same paging mechanism for NB-IoT devices regardless of operation mode, including inband operation, standalone operation, and guard band operation. Furthermore, some embodiments may prevent collisions of frames sent via paging. Other advantages may

BRIEF DESCRIPTION OF THE DRAWINGS

FIG. 4 is a schematic diagram of an example user equipment in accordance with certain embodiments of the present disclosure.

DETAILED DESCRIPTION

Figure 1:
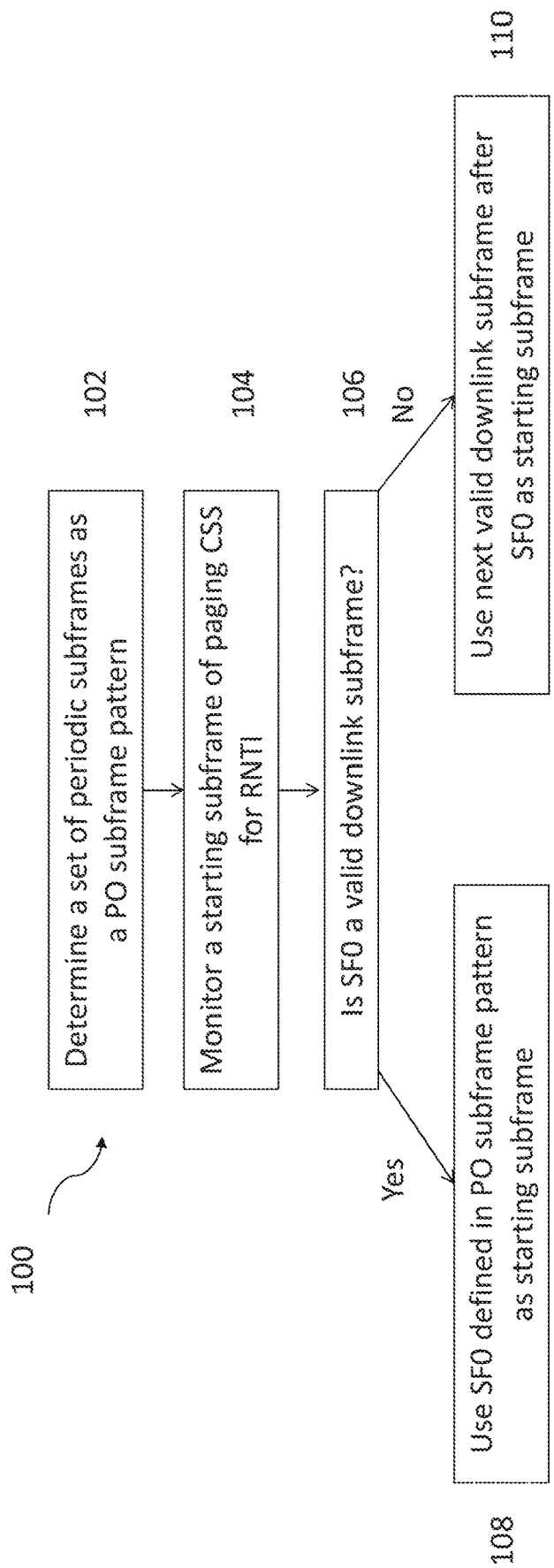
FIG. 1 is a process flow diagram for an example method performed by a user equipment in accordance with certain embodiments of the present disclosure.

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

1.1 Subframes Occupied by Other Broadcast Channels/Signals

According to particular embodiments, subframes occupied by other broadcast channels or signals may interfere with paging messages. Paging transmission is associated with a paging Radio Network Temporary Identifier (P-RNTI). It can be sent via either of two variations:

(a) NB-IoT Physical Downlink Control Channel (NPDCCH) without NB-IoT Physical Downlink Shared Channel (NPDSCH). This variant could be used for notify about System Information (SI) updates. In this case, the downlink control information (DCI) carried by NPDCCH may contain a flag which indicates that there is an SI update without scheduling information of NPDSCH. If NB-IoT UEs support Earthquake & Tsunami Warning System (ETWS), Cellular Messaging Alert System (CMAS), Extended Access Barring (EAB), or various other alerts or messages, the DCI may provide an indicator for these as well.

(b) NPDCCH with the corresponding NPDSCH. This variant could be used for sending a paging message, where the DCI bits carry scheduling information of NPDSCH for a paging message.

For NB-IoT operation, subframes $\{0, 4, 5, 9\}$ are densely occupied by other broadcast channels/signals including, but not limited to the following:

NPBCH: NPBCH fully occupies the PRB at subframe 0 in every radio frame;

NPSS: NPSS is transmitted in subframe 5 with periodicity of 10 ms. NPSS uses the last 11 OFDM symbols of subframes in which NPSS occurs for normal CP. That is, NPSS takes subframe 5 in every radio frame;

NSSS: NSSS is transmitted in subframe 9. NSSS uses the last 11 OFDM symbols of subframes in which NSSS occurs for normal CP. Periodicity of NSSS has been set at 20 ms;

NSIB1 (NB-IoT System Information Block): NSIB1 is transmitted in subframe #4 within each radio frame transmitting NSIB1. The radio frame occupied by NSIB1 occurs in every other frame in 16 consecutive radio frames, with the cluster 16 radio frame occurs every $\{64, 32, 16\}$ radio frames.

As can be seen, these broadcast channels/signals are generally transmitted on particular subframes according a pattern that is known to both network nodes and wireless devices operating within the system. Given the densely occupied subframes, there is a need to provide a sufficient number of opportunities for sending paging so that the various nodes and devices can communicate. Common search space (CSS) for paging is the key for sending NPDCCH of paging. According to particular embodiments, a UE monitors the CSS for paging for potential paging transmission. The potential starting point of CSS for paging is then aligned with the paging occasion (PO), which may be defined for a given UE. In order to have sufficient opportunities to page the UEs in the cell, then there needs proper definition of paging frame (PF) and paging occasion (PO). After alignment, the UE is then able to send paging transmissions.

1.2 Inband Operation

For all operation modes, including multi-PRB operation, the UE receives paging on the anchor PRB. Other than paging NPDCCH and NPDSCH, several types of broadcast channels and signals may also take place on the same PRB, including NPBCH, NPSS, NSSS, NSIB1, and other SIB transmission.

Additionally, for inband operation, an MBSFN subframe pattern exists and must be adhered to. This limits the subframes to SF $\{0, 4, 5, 9\}$ in a radio frame for transmitting NPBCH, NPSS, NSSS, NSIB1, paging starting subframe.

Thus, compared to legacy LTE, the possible subframes to start paging CSS is very limited:

Subframe 4 in those radio frames not occupied by NSIB1;

Subframe 9 in those radio frames not occupied by NSSS;

1.2.1 Indication Directly with Absolute Subframe Indices

Subframe 0 and 5 are not available for paging CSS any longer. According to particular embodiments, the paging subframe pattern for FDD may then be modified to Table 1.

To provide sufficient opportunities to page NB-IoT UEs, several mechanisms are considered:

1. Preserve sufficient number of paging opportunities. For example, NSSS is transmitted at most in every other radio frame. This leaves at least subframe 4 in every other radio frame for paging CSS.
2. Define mechanisms to handle collision.
   a. In one embodiment, if the $\{PF, PO\}$ resulting from a legacy PF/PO calculation collides with another broadcast transmission, then the UE is paged in the next non-colliding RF with the same PO. For example, if the paging occasion collides with the NSSS or NSIB1 transmission, the UE is paged in the next available radio frame not containing NSSS or NSIB1. In this case, the $\{PF, PO\}$ may be outside the set of possible paging opportunities according to PF/PO calculation. That is,
      i. If PF with PO=4 collides with a NSSS transmission, the paging CSS of the UE starts in next SFN: SFN'=SFN+1 (mod 1024) with PO=4, where SFN is according to the PF calculation: SFN mod T=(T div N)*(UE_ID mod N). Note that (mod 1024) is necessary to take care of SNR wrap around.
      ii. If PF with PO=9 collides with a NSIB1 transmission, the paging CSS of the UE starts in next SFN:

SFN'=SFN+1 (mod 1024) with PO=9, where SFN is according to the PF calculation: SFN mod T=(T div N)*(UE_ID mod N).

b. In another embodiment, if the {PF, PO} resulting from legacy PF/PO calculation collides with another broadcast transmission (e.g., NSIB1 or NSSS), then the UE is paged in the next non-colliding PO available to the UE. The next non-colliding PO can be in the current calculated PF, or the subsequent available PF according to PF calculation.

TABLE 1

Paging subframe pattern for FDD (modifications shown with strikethrough):

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0̶ N/A | 4 | 5̶ N/A | 9 |

Note that for NB-IoT in TDD system in the future, similar methods can be used to handle collisions. That is, delay to the next non-colliding radio frame of the same PO, or delay to the next available PO available to the UE.

1.2.2 Indication Indirectly with Valid Subframe Indices

According to other embodiments, additional subframes that are not used for paging in legacy LTE operation are made available for paging for NB-IoT. This may be beneficial if paging capacity becomes a bottleneck for NB-IoT. A parameter indicative of what subframes that are considered as valid downlink subframes in the cell may already be broadcasted for other purposes throughout the cell. The set of valid DL subframes can be signaled in the form of a bitmap in a system information block. For example, the bitmap is [b(0), b(1), ... , b(p-1)], where b(i)=0 indicates subframe i in the period is an invalid DL subframe, while b(i)=1 indicates subframe i in the period is a valid DL subframe.

If this bitmap parameter indicates that some downlink subframes are considered valid subframes, it can be assumed that these subframes will not be used for MBSFN transmission, and then these subframes can be used for paging.

Let the cell-specific valid subframe set be {vsf(0), vsf(1), ... vsf(m-1)} by taking those b(i)>1 in the bitmap, where m is the total number of valid DL subframes in the period of p subframes, m<=p. Then the PO can be defined using one or more of vsf. One example is listed below in Table 1-1, assuming there are m>=4 vsf over the time duration p the vsf is defined over. While existing paging occasion definition is over a radio frame (i.e., 10 subframes, which is equal to 10 ms), the vsf may be defined over a radio frame or other appropriate durations. Typical durations for defining vsf are: (a) p=10, i.e., 10 subframes (=1 radio frame); (b) p=40, i.e., 40 subframes (=4 radio frames).

Using the vsf concept in defining PO could avoid collision with those subframes which are taken into account in defining the vsf. However, collision with those subframes which are not taken into account in defining the vsf can still happen. For example, subframe #9 may not be designated as invalid DL subframe since NSSS does not occupy subframe #9 in all radio frames. Thus, paging CSS may still collide with NSSS using the vsf concept. Thus there is still the need to define mechanisms to handle the collision. Mechanisms like those described in the last sub-section can be used.

TABLE 1-1

Paging subframe pattern defined with valid subframe (vsf) indices:

| Ns | PO when i_s = 0 | PO when i_s = 1 | PO when i_s = 2 | PO when i_s = 3 |
|---|---|---|---|---|
| 1 | vsf(3) | N/A | N/A | N/A |
| 2 | vsf(1) | vsf(3) | N/A | N/A |
| 4 | vsf(0) | vsf(1) | vsf(2) | vsf(3) |

1.3 Standalone or Guard Band Operation

1.3.1 FDD Standalone or Guard Band Operation

For standalone or guard band operation, the set of subframes occupied by NPBCH, NPSS, NSSS, and NSIB1 are the same as inband operation, as discussed above. However, there is no legacy MBSFN transmission.

Hence there are at least two alternatives of handling paging CSS for standalone and/or guard band operations for FDD system. Two of these primary alternatives are discussed below, but it will be appreciated that additional embodiments may be used.

Alternative 1. Do not introduce new subframes for the PO for paging CSS. In this alternative, the set of subframes possible to start paging CSS is still {0, 4, 5, 9} for FDD. In this case, the same mechanisms for defining paging CSS in inband operation is reused for standalone and guard band operation.

Alternative 2. Introduce new subframes for the PO for paging CSS. In this alternative, new subframe pattern for the PO is defined. The new subframe pattern can be defined directly by absolute subframe indices, or indirectly via valid subframe indices vsf. Below the discussion uses the absolute subframe indexing way to illustrate.

One example is to use a completely new set of subframes, e.g., subframe {1,2,6,7} instead of subframe {0,4,5,9}. Correspondingly, the PO table is modified to Table 2.

Another example is to replaces a subset of the PO subframes, but keep the rest of the existing PO subframes. For example, subframe {0, 5} are replaced by subframe {1, 6}, respectively, but subframe {4, 9} are kept. Correspondingly, the PO table is modified to Table 3.

TABLE 2

New paging subframe pattern for FDD standalone or guard band operation

| Ns | PO when i_s = 0 | PO when i_s = 1 | PO when i_s = 2 | PO when i_s = 3 |
|---|---|---|---|---|
| 1 | 7 | N/A | N/A | N/A |
| 2 | 2 | 7 | N/A | N/A |
| 4 | 1 | 2 | 6 | 7 |

TABLE 3

New paging subframe pattern for FDD standalone or guard band operation

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0̶ 1 | 4 | 5̶ 6 | 9 |

1.3.2 TDD Standalone or Guard Band Operation

Note that for NB-IoT in TDD system in the future, subframe pattern for PO should be handled as well.

1.3.2.1 TDD Without Broadcasting Valid Subframe Pattern

According to particular embodiments, a TDD system may be used without broadcasting a valid subframe pattern. If no valid subframe pattern is broadcast, then a new subframe set cannot be defined in place of subframe {0, 1, 5, 6} if all existing TDD UL/DL configurations are considered. This is because subframe {0, 1, 5, 6} is the only set of DL or special subframes common to all TDD UL/DL configurations. In this case, only Alternative 1 is possible:

Alternative 1. Do not introduce new PO for paging CSS. In this alternative, the set of subframes possible to start paging CSS is still {0, 1, 5, 6} for TDD. In this case, the same mechanisms for defining paging CSS in inband operation is reused for standalone and guard band operation. If the {PF, PO} resulting from legacy PF/PO calculation collides with the NSSS or NSIB1 transmission, the UE is paged in the next available radio frame not containing NSSS or NSIB1.

On the other hand, if only a subset of all existing TDD UL/DL configurations are considered, more DL or special subframes can be available. For example, if only UL/DL configurations 1 and 2 are supported for NB-IoT, then the set of DL or special subframes common to both are subframe {0, 1, 4, 5, 6, 9}. In this case, Alternative 1 can be used. In addition, Alternative 2 is also possible. That is, Alterative 2. Introduce one or more new PO for paging CSS. For example, replace a subset of the existing PO subframes with new PO suframes, but keep the rest of the existing PO subframes. For example, subframe {0, 5} are replaced by subframe {4, 9}, respectively, but subframe {1, 6} are kept. This is illustrated by Table 5.

TABLE 4

TDD Uplink-downlink configurations

| Uplink-<br>downlink<br>configuration | Downlink-<br>to-Uplink<br>Switch-point<br>periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 5

New paging subframe pattern for TDD standalone or guard band operation (changes shown with strikethrough)

| Ns | PO when i_s = 0 | PO when i_s = 1 | PO when i_s = 2 | PO when i_s = 3 |
|---|---|---|---|---|
| 1 | 0̶ 4 | N/A | N/A | N/A |
| 2 | 0̶ 4 | 5̶ 9 | N/A | N/A |
| 4 | 0̶ 4 | 1 | 5̶ 9 | 6 |

1.3.2.2 TDD with Broadcasting Valid Subframe Pattern

If a valid subframe pattern is broadcast cell-wide, then the vsf can be used to define the subframe pattern for TDD. A table similar to Table 1-1 can be constructed for TDD. One example is illustrated below as Table 6.

TABLE 6

Paging subframe pattern defined with valid subframe (vsf) indices:

| Ns | PO when i_s = 0 | PO when i_s = 1 | PO when i_s = 2 | PO when i_s = 3 |
|---|---|---|---|---|
| 1 | vsf(0) | N/A | N/A | N/A |
| 2 | vsf(0) | vsf(2) | N/A | N/A |
| 4 | vsf(0) | vsf(1) | vsf(2) | vsf(3) |

1.4 Determine Paging CSS Using Valid Subframe Pattern Without Changing PO Subframe Pattern According to additional embodiments, the subframes for paging CSS can be determined using valid DL subframe pattern without changing the paging subframe look-up table. That is, subframe pattern table, Table 0-1 for FDD and Table 0-2 for TDD, are used, the same as in legacy system. The benefit of these embodiments is that the total number of paging opportunities is not reduced.

The starting subframes for paging CSS is determined by the {PF, PO} and valid DL subframe pattern.

If the subframe sf0 determined by PF and PO is a valid DL subframe, then the subframe sf0 is the starting subframe of the paging CSS for this set of {PF, PO}.

If the subframe sf0 determined by PF and PO is NOT a valid DL subframe, then the first valid subframe that come after sf0 is the starting subframe of the paging CSS for this set of {PF, PO}.

For example, if {PF, PO} points to a subframe #9 which is occupied by NSSS in the given SFN, then the starting subframe of the corresponding paging CSS is delayed to the next valid DL subframe, for example, subframe #1 of the next radio frame.

if {PF, PO} points to subframe #9 which is NOT occupied by NSSS in the given SFN, then the starting subframe of the corresponding paging CSS is the subframe #9.

In addition, the paging CSS is defined over valid subframes, where the paging NPDCCH candidate is only transmitted over valid subframes. That is, if a paging NPDCCH repetition runs into an invalid subframe, the repetition is delayed to the next valid subframe.

In one method, the valid subframe pattern VSFa (or invalid subframe pattern) is the valid DL pattern broadcast by the eNB via a SIB.

In another method, the invalid subframe pattern for paging is composed of the aggregate of subframes occupied by known broadcast channel/signal, such as NPBCH/NPSS/NSSS/NSIB1, and not signaled via broadcast. The valid subframe pattern VSFb is then composed of those subframes NOT occupied by the known broadcast channel/signal such as NPBCH/NPSS/NSSS/NSIB1.

In yet another method, the valid subframe pattern is the composite of VSFa and VSFb. That is, a subframe is deemed a valid subframe only if it is a valid subframe in VSFa and also a valid subframe in VSFb.

According particular embodiments, these solutions may be carried out in a method performed by a user equipment, as illustrated in FIG. 1.

FIG. 1 discloses a method 100, performed by a user equipment (UE) operating in idle mode, for determining common search space (CSS) for NB-IoT paging. The method begins at step 102, when the user equipment determines a set of periodic subframes as a Paging Occasion (PO)

subframe pattern. This PO subframe pattern, sometimes referred to as {PF, PO}, may be determined in a variety of manners, including but not limited to the use of a subframe pattern table. Here PF refers to Paging Frame. Such a table may be defined by existing standards, such as section 7 of 3GPP TS 36.304. According to particular embodiments, this table may be the table shown in Tables 0-1 and 0-2 above.

Regardless of how the PO subframe pattern is determined, at step 104, the user equipment monitors a starting subframe of paging CSS for a Radio Network Temporary Identifier (RNTI). However, other suitable identifiers may be used. At step 106, it is determined whether a first subframe (SF0), defined by the PO subframe pattern, is a valid downlink subframe. This determination may be made in a variety of manners.

According to a particular embodiment, the UE determines a subframe is a valid downlink subframe if it is indicated as a valid downlink subframe in a Narrowband SIB1 received from a network node. In 3GPP TS 36.331, this NB-SIB1 may be referred to as "SystemInformationBlockType1-NB." The UE may also determine that a subframe is a valid downlink subframe if it does not include any known broadcast channels or signals, including, but not limited to NPSSS, NSSS, NPBCH, and NB-SIB1. The UE may also determine that a subframe is a valid downlink subframe if it is included in a valid subframe pattern. Such a valid subframe pattern may be received in a SIB message broadcast by a network node. This may be "downlinkBitmapNB" as referred to in 3GPP TS 36.331 and 36.213. The valid subframe pattern may also include subframes not occupied by known broadcast channels or broadcast signals. The UE may also determine that a subframe is a valid downlink subframe based on a combination of these valid subframe patterns.

According to particular embodiments, the UE may make this determination of valid downlink subframes based on any of the criteria discussed above, either alone or in any permissible combination thereof. When it is determined to be a valid subframe, at step 108 SF0 is used as the starting subframe of paging CSS. When SF0 is not a valid subframe, at step 110 the next valid downlink subframe after SF0 is used as the starting subframe of paging CSS. According to particular embodiments, SF0 may be defined to be a starting subframe of Narrowband Physical Data Control Channel (NPDCCH) repetitions. This definition may be included in the Paging Occasion subframe pattern. According to additional embodiments, CSS may be defined only over valid downlink subframes. Under these embodiments, when NPDCCH repetition overlaps with an invalid downlink subframe, the repetition may be delayed until a next valid downlink subframe.

Figure 2:
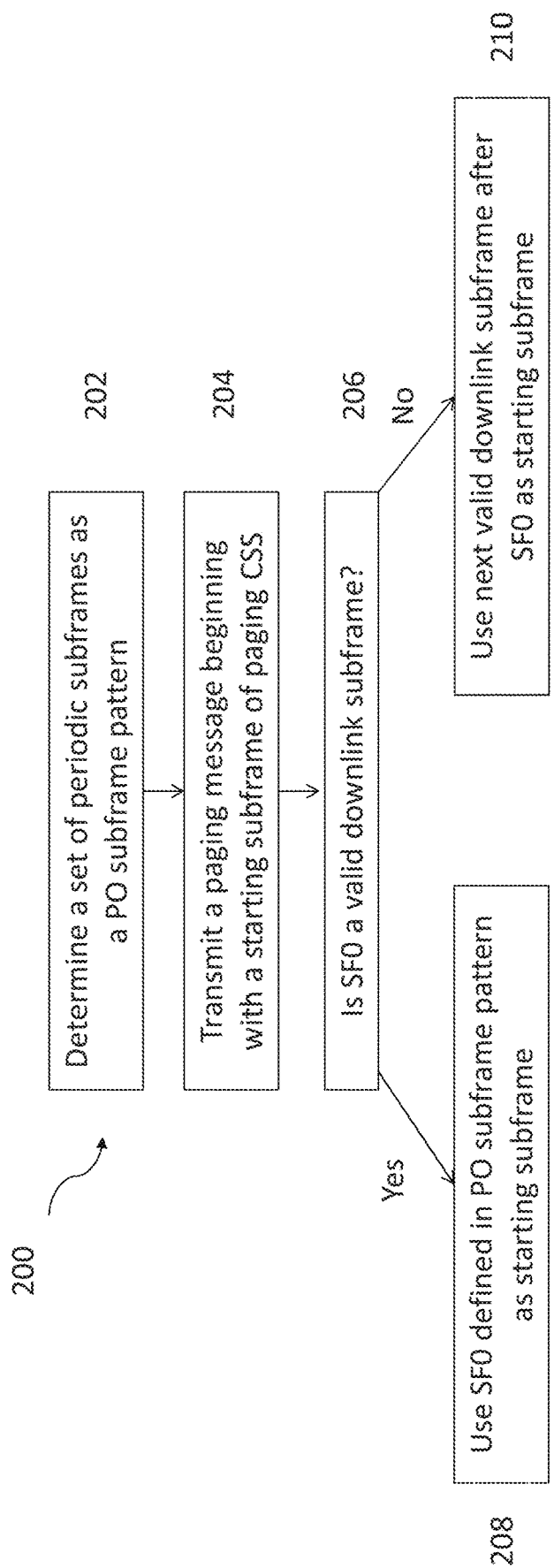
FIG. 2 is a process flow diagram for an example method performed by a network node in accordance with certain embodiments of the present disclosure.

According particular embodiments, the solutions proposed herein may also be carried out in a method performed by a network node, as illustrated in FIG. 2.

FIG. 2 discloses a method 200, performed by a network node, for determining common search space (CSS) for NB-IoT paging. The method begins at step 202, when the network node determines a set of periodic subframes as a Paging Occasion (PO) subframe pattern. This PO subframe pattern, sometimes referred to as {PF, PO}, may be determined in a variety of manners, including but not limited to the use of a subframe pattern table. Such a table may be defined by existing standards, such as section 7 of 3GPP TS 36.304. According to particular embodiments, this table may be the table shown in Tables 0-1 and 0-2 above.

Regardless of how the PO subframe pattern is determined, at step 204, the network node transmits a paging message to a user equipment, the paging message beginning with a starting subframe of paging CSS. At step 206, it is determined whether a first subframe (SF0), defined by the PO subframe pattern, is a valid downlink subframe. This determination may be made in a variety of manners.

According to a particular embodiment, the network node determines a subframe is a valid downlink subframe if it does not include any known broadcast channels or signals, including, but not limited to NPSSS, NSSS, NPBCH, and NB-SIB1. The network may also determine that a subframe is a valid downlink subframe if it is included in a valid subframe pattern. An indication of a valid downlink subframe may be provided in a SIB1 transmitted to a user equipment, either in an indication that an individual subframe is valid, or in the form of a valid subframe pattern. The valid subframe pattern may also include subframes not occupied by known broadcast channels or broadcast signals.

According to particular embodiments, the network node may make this determination of valid downlink subframes based on any of the criteria discussed above, either alone or in any permissible combination thereof. When it is determined to be a valid subframe, at step 208 SF0 is used as the starting subframe of paging CSS. When SF0 is not a valid subframe, at step 210 the next valid downlink subframe after SF0 is used as the starting subframe of paging CSS. According to particular embodiments, SF0 may be defined to be a starting subframe of Narrowband Physical Data Control Channel (NPDCCH) repetitions. This definition may be included in the Paging Occasion subframe pattern. According to additional embodiments, CSS may be defined only over valid downlink subframes. Under these embodiments, when NPDCCH repetition overlaps with an invalid downlink subframe, the repetition may be delayed until a next valid downlink subframe.

Figure 3:
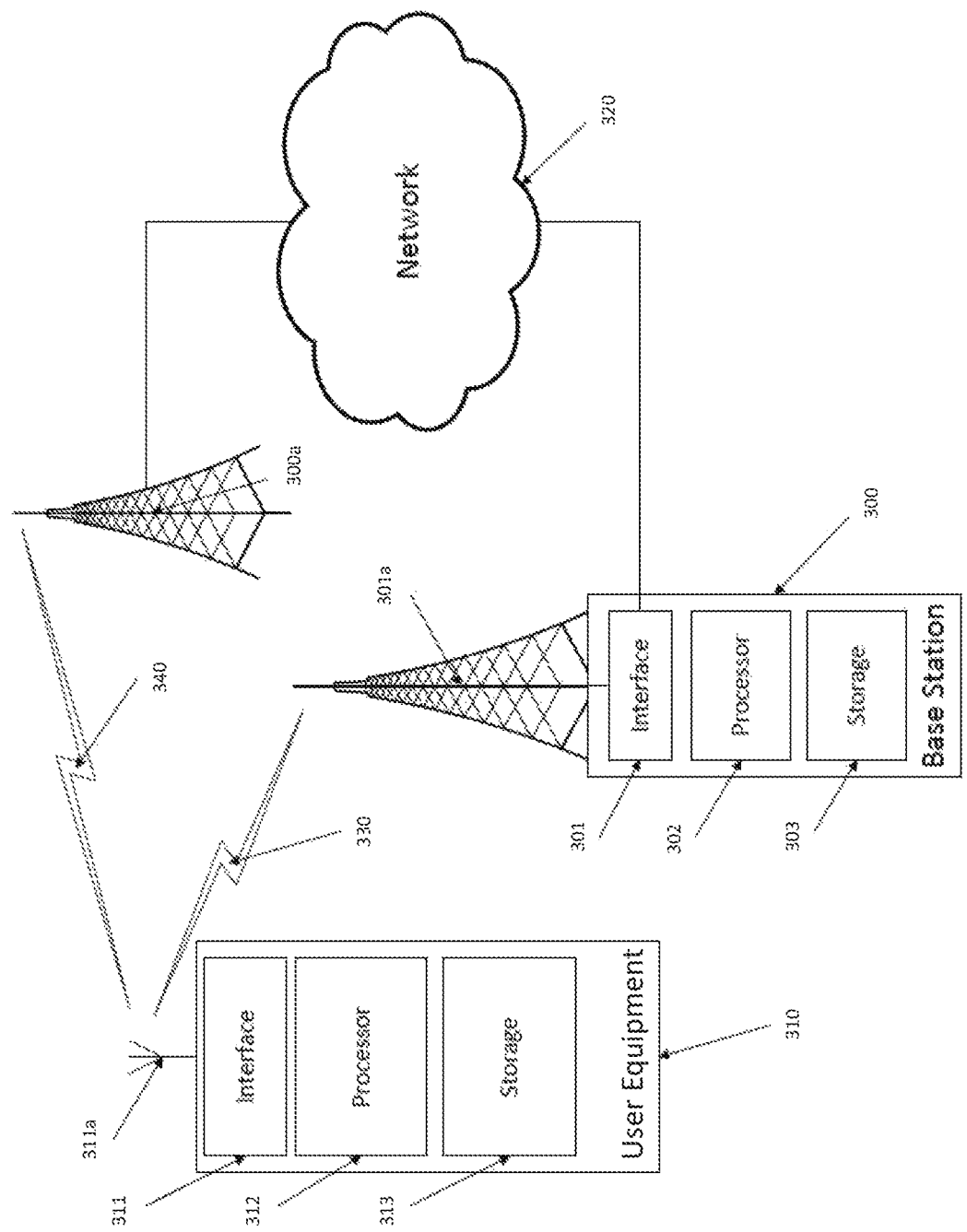
FIG. 3 is a schematic diagram of an example wireless communication network in accordance with certain embodiments of the present disclosure.

Although the solutions described above may be implemented in any appropriate type of system using any suitable components, particular embodiments of the described solutions may be implemented in a wireless network such as the example wireless communication network illustrated in FIG. 3. In the example embodiment of FIG. 3, the wireless communication network provides communication and other types of services to one or more user equipments. In the illustrated embodiment, the wireless communication network includes one or more instances of network nodes that facilitate the user equipments' access to and/or use of the services provided by the wireless communication network. The wireless communication network may further include any additional elements suitable to support communication between user equipments or between a wireless device and another communication device, such as a landline telephone.

Network 320 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 3 illustrates a wireless network comprising a more detailed view of network node 300 and user equipment (UE) 310, in accordance with a particular embodiment. For simplicity, FIG. 3 only depicts network 320, network nodes 300 and 300a, and UE 310. Network node 300 comprises processor 302, storage 303, interface 301, and antenna 301a. Similarly, UE 310 comprises processor 312, storage 313, interface 311 and antenna 311a. These components may work together in order to provide network node and/or user equipment functionality, such as providing wireless connections in a wireless network, as well as the embodiments described above in FIGS. 1 and 2. In different embodiments, the wireless network may comprise any number of wired or wireless networks, network nodes, base stations, controllers, user equipments, relay stations, and/or any other components that may facilitate or participate in the communication of data and/or signals whether via wired or wireless connections.

As used herein, "network node" refers to equipment capable, configured, arranged and/or operable to communicate directly or indirectly with a user equipment and/or with other equipment in the wireless communication network that enable and/or provide wireless access to the user equipment. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a user equipment access to the wireless communication network or to provide some service to a user equipment that has accessed the wireless communication network.

As used herein, the term "radio node" is used generically to refer both to user equipments and network nodes, as each is respectively described above.

In FIG. 3, Network node 300 comprises processor 302, storage 303, interface 301, and antenna 301a. These components are depicted as single boxes located within a single larger box. In practice however, a network node may comprise multiple different physical components that make up a single illustrated component (e.g., interface 301 may comprise terminals for coupling wires for a wired connection and a radio transceiver for a wireless connection). As another example, network node 300 may be a virtual network node in which multiple different physically separate components interact to provide the functionality of network node 300 (e.g., processor 302 may comprise three separate processors located in three separate enclosures, where each processor is responsible for a different function for a particular instance of network node 300). Similarly, network node 300 may be composed of multiple physically separate components (e.g., a NodeB component and a RNC component, a BTS component and a BSC component, etc.), which may each have their own respective processor, storage, and interface components. In certain scenarios in which network node 300 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 300 may be configured to support multiple radio access technologies (RATs). In such embodiments, some components may be duplicated (e.g., separate storage 303 for the different RATs) and some components may be reused (e.g., the same antenna 301 may be shared by the RATs).

Processor 302 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 303, network node 300 functionality. For example, processor 302 may execute instructions stored in storage 303. Such functionality may include providing various wireless features discussed herein to a user equipment, such as UE 310, including any of the features or benefits disclosed herein.

Storage 303 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 303 may store any suitable instructions, data or information, including software and encoded logic, utilized by network node 300. Storage 303 may be used to store any calculations made by processor 302 and/or any data received via interface 301.

Network node 300 also comprises interface 301 which may be used in the wired or wireless communication of signalling and/or data between network node 300, network 320, and/or UE 310. For example, interface 301 may perform any formatting, coding, or translating that may be needed to allow network node 300 to send and receive data from network 320 over a wired connection. Interface 301 may also include a radio transmitter and/or receiver that may be coupled to or a part of antenna 301a. The radio may receive digital data that is to be sent out to other network nodes or UEs via a wireless connection. The radio may convert the digital data into a radio signal having the appropriate channel and bandwidth parameters. The radio signal may then be transmitted via antenna 301*a* to the appropriate recipient (e.g., UE 310).

Antenna 301*a* may be any type of antenna capable of transmitting and receiving data and/or signals wirelessly. In some embodiments, antenna 301*a* may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "user equipment" (UE) or "wireless device" (WD) refers to a device capable, configured, arranged and/or operable to communicate wirelessly with network nodes and/or another user equipment. Communicating wirelessly may involve transmitting and/or receiving wireless signals using electromagnetic signals, radio waves, infrared signals, and/or other types of signals suitable for conveying information through air. In particular embodiments, user equipments may be configured to transmit and/or receive information without direct human interaction. For instance, a user equipment may be designed to transmit information to a network on a predetermined schedule, when triggered by an internal or external event, or in response to requests from the network. Generally, a user equipment or wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The user equipment may support device-to-device (D2D) communication, for example by implementing a 3GPP standard for sidelink communication, and may in this case be referred to as a D2D communication device.

As yet another specific example, in an Internet of Things (TOT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 3, UE 310 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 300 and/or other UEs. UE 310 comprises processor 312, storage 313, interface 311, and antenna 311*a*. Like network node 300, the components of UE 310 are depicted as single boxes located within a single larger box, however in practice a user equipment may comprises multiple different physical components that make up a single illustrated component (e.g., storage 313 may comprise multiple discrete microchips, each microchip representing a portion of the total storage capacity).

Processor 312 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other UE 310 components, such as storage 313, UE 310 functionality. Such functionality may include providing various wireless features discussed herein, including any of the features or benefits disclosed herein.

Storage 313 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by UE 310. Storage 313 may be used to store any calculations made by processor 312 and/or any data received via interface 311.

Interface 311 may be used in the wireless communication of signalling and/or data between UE 310 and network node 300. For example, interface 311 may perform any formatting, coding, or translating that may be needed to allow UE 310 to send and receive data from network node 300 over a wireless connection. Interface 311 may also include a radio transmitter and/or receiver that may be coupled to or a part of antenna 311*a*. The radio may receive digital data that is to be sent out to network node 301 via a wireless connection. The radio may convert the digital data into a radio signal having the appropriate channel and bandwidth parameters. The radio signal may then be transmitted via antenna 311*a* to network node 300.

Antenna 311*a* may be any type of antenna capable of transmitting and receiving data and/or signals wirelessly. In some embodiments, antenna 311*a* may comprise one or more omni-directional, sector or panel antennas operable to transmit/receive radio signals between 2 GHz and 66 GHz. For simplicity, antenna 311*a* may be considered a part of interface 311 to the extent that a wireless signal is being used.

Although the user equipment utilized in the example wireless communication network of FIG. 2 may represent a device that includes any suitable combination of hardware and/or software, this user equipment may, in particular embodiments, represent a device such as the example user equipment 900 illustrated in greater detail by FIG. 4.

As shown in FIG. 4, an example user equipment 900 includes an antenna 905, radio front-end circuitry 910, processing circuitry 920, and a computer-readable storage medium 930. Antenna 905 may include one or more antennas or antenna arrays, and is configured to send and/or receive wireless signals, and is connected to radio front-end circuitry 910. In certain alternative embodiments, user equipment 900 may not include antenna 905, and antenna 905 may instead be separate from user equipment 900 and be connectable to user equipment 900 through an interface or port.

The radio front-end circuitry 910 may comprise various filters and amplifiers, is connected to antenna 905 and processing circuitry 920, and is configured to condition signals communicated between antenna 905 and processing circuitry 920. In certain alternative embodiments, user equipment 900 may not include radio front-end circuitry 910, and processing circuitry 920 may instead be connected to antenna 905 without radio front-end circuitry 910.

Processing circuitry 920 may include one or more of radio frequency (RF) transceiver circuitry 921, baseband processing circuitry 922, and application processing circuitry 923. In some embodiments, the RF transceiver circuitry 921, baseband processing circuitry 922, and application processing circuitry 923 may be on separate chipsets. In alternative embodiments, part or all of the baseband processing circuitry 922 and application processing circuitry 923 may be combined into one chipset, and the RF transceiver circuitry 921 may be on a separate chipset. In still alternative embodiments, part or all of the RF transceiver circuitry 921 and baseband processing circuitry 922 may be on the same chipset, and the application processing circuitry 923 may be on a separate chipset. In yet other alternative embodiments, part or all of the RF transceiver circuitry 921, baseband processing circuitry 922, and application processing circuitry 923 may be combined in the same chipset. Processing circuitry 920 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a user equipment may be provided by the processing circuitry 920 executing instructions stored on a computer-readable storage medium 930, as shown in FIG. 4. In alternative embodiments, some or all of the functionality may be provided by the processing circuitry 920 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 920 alone or to other components of the user equipment, but are enjoyed by the user equipment as a whole, and/or by end users and the wireless network generally.

Antenna 905, radio front-end circuitry 910, and/or processing circuitry 920 may be configured to perform any receiving operations described herein as being performed by a user equipment. Any information, data and/or signals may be received from a network equipment and/or another user equipment.

The processing circuitry 920 may be configured to perform any determining or other operations described herein as being performed by a user equipment. Determining as performed by processing circuitry 920 may include processing information obtained by the processing circuitry 920 by, for example, converting the obtained information into other information, comparing the obtained information or converted information to information stored in the user equipment, and/or performing one or more operations based on the obtained information or converted information, and as a result of said processing making a determination.

Antenna 905, radio front-end circuitry 910, and/or processing circuitry 920 may be configured to perform any transmitting operations described herein as being performed by a user equipment. Any information, data and/or signals may be transmitted to a network equipment and/or another user equipment.

Computer-readable storage medium 930 is generally operable to store instructions, such as a computer program, software, an application including one or more of logic, rules, code, tables, etc. and/or other instructions capable of being executed by a processor. Examples of computer-readable storage medium 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 920. In some embodiments, processing circuitry 920 and computer-readable storage medium 930 may be considered to be integrated.

Alternative embodiments of the user equipment 900 may include additional components beyond those shown in FIG. 4 that may be responsible for providing certain aspects of the user equipment's functionality, including any of the functionality described herein and/or any functionality necessary to support the solution described above. As just one example, user equipment 900 may include input interfaces, devices and circuits, and output interfaces, devices and circuits. Input interfaces, devices, and circuits are configured to allow input of information into user equipment 900, and are connected to processing circuitry 920 to allow processing circuitry 920 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from user equipment 900, and are connected to processing circuitry 920 to allow processing circuitry 920 to output information from user equipment 900. For example, output interfaces, devices, or circuits may include a speaker, a display, vibrating circuitry, a USB port, a headphone interface, or other output elements. Using one or more input and output interfaces, devices, and circuits, user equipment 900 may communicate with end users and/or the wireless network, and allow them to benefit from the functionality described herein.

As another example, user equipment 900 may include power supply circuitry 940. The power supply circuitry 940 may comprise power management circuitry. The power supply circuitry may receive power from a power source, which may either be comprised in, or be external to, power supply circuitry 940. For example, user equipment 900 may comprise a power source in the form of a battery or battery pack which is connected to, or integrated in, power supply circuitry 940. Other types of power sources, such as photovoltaic devices, may also be used. As a further example, user equipment 900 may be connectable to an external power source (such as an electricity outlet) via an input circuitry or interface such as an electrical cable, whereby the external power source supplies power to power supply circuitry 940.

Power supply circuitry 940 may be connected to radio front-end circuitry 910, processing circuitry 920, and/or computer-readable storage medium 930 and be configured to supply user equipment 900, including processing circuitry 920, with power for performing the functionality described herein.

User equipment 900 may also include multiple sets of processing circuitry 920, computer-readable storage medium 930, radio circuitry 910, and/or antenna 905 for different wireless technologies integrated into user equipment 900, such as, for example, GSM, WCDMA, LTE, NR, WiFi, or Bluetooth wireless technologies. These wireless technologies may be integrated into the same or different chipsets and other components within user equipment 900.

| Abbreviation | Explanation |
| --- | --- |
| NB | Narrow band |
| NB-IoT | Narrowband Internet of Things |
| MTC | Machine Type Communications |
| PSS | Primary Synchronization Sequence |
| SSS | Secondary Synchronization Sequence |
| SIM Module | Subscriber Identity Module or Subscriber Identification |
| CRC | Cyclic Redundancy Check |
| NPSS | NB-IoT Primary Synchronization Sequence |
| NSSS | NB-IoT Secondary Synchronization Sequence |
| LTE | Long Term Evolution |
| DFT | Discrete Fourier Transform |
| IFFT | Inverse fast fourier transform |
| CRS | Cell Specific Reference Signals |
| PDCCH | Physical Downlink Control Channel |
| CP | Cyclic prefix |
| FDD | Frequency-division duplex |
| TDD | Time-division duplex |
| NPBCH | NB-IoT Physical Broadcast Channel |
| SNR | signal to noise ratios |
| OFDM | Orthogonal frequency-division multiplexing |
| ZC | Zadoff-Chu |
| CSS | common search space |
| USS | UE-specific search space |
| PRB | Physical Resource Block |
| DL | Downlink |
| UL | Uplink |

The invention claimed is:

1. A method performed by a user equipment (UE) in idle mode, for determining common search space (CSS) for Narrowband Internet of Things (NB-IoT) paging, the method comprising:
monitoring a starting subframe of the CSS for a Radio Network Temporary Identifier (RNTI);
wherein the starting subframe of the CSS is determined as follows:
use a first subframe (SF0), according to a Paging Occasion subframe table, when the first subframe is determined, based on a received bitmap, to be a valid downlink subframe; and
use a next valid downlink subframe after the first subframe when the first subframe is determined to be an invalid downlink subframe.

2. The method according to claim 1, wherein the UE determines that a subframe is a valid downlink subframe if: the subframe is indicated as a valid downlink subframe in a Narrowband System Information Block 1 (NB-SIB1); and
the subframe does not contain any of the following:
NB-IoT Primary Synchronization Sequence (NPSS);
NB-IoT Secondary Synchronization Sequence (NSSS);
NB-IoT Physical Broadcast Channel (NPBCH); and
NB-SIB1.

3. The method according to claim 1, wherein the first subframe is indicated by the Paging Occasion subframe table to be a starting subframe of Narrowband Physical Data Control Channel (NPDCCH) repetitions.

4. The method according to claim 3, wherein the CSS is defined only over valid downlink subframes, such that when the NPDCCH repetition overlaps with an invalid downlink subframe, the NPDCCH repetition is delayed until a next valid downlink subframe.

5. The method according to claim 1, wherein the UE determines a subframe is a valid downlink subframe based on a valid subframe pattern received in a System Information Block (SIB) message broadcast by a network node.

6. The method according to claim 1, wherein the UE determines a subframe is a valid downlink subframe based on a valid subframe pattern, the valid subframe pattern comprising subframes not occupied by known broadcast channels or broadcast signals.

7. The method according to claim 1, wherein the UE determines a subframe is a valid downlink subframe based on a first valid subframe pattern and a second valid subframe pattern;
the first valid subframe pattern being a downlink subframe pattern received in a System Information Block (SIB) message broadcast by a network node; and
the second valid subframe pattern comprising subframes not occupied by known broadcast channels or broadcast signals.

8. A method, performed by a network node, for determining common search space (CSS) for Narrowband Internet of Things (NB-IoT) paging, the method comprising:
transmitting a paging message to a user equipment (UE), the paging message beginning with a starting subframe of the CSS;
wherein the starting subframe of the CSS is determined as follows:
use a first subframe (SF0), according to a Paging Occasion subframe table, when the first subframe is determined, based on a received bitmap, to be a valid downlink subframe; and
use a next valid downlink subframe after the first subframe when the first subframe is determined to be an invalid downlink subframe.

9. The method according to claim 8, further comprising:
indicating a downlink subframe as valid in a Narrowband System Information Block 1 (NB-SIB1); and
wherein the network node determines the subframe is a valid downlink subframe if the subframe does not contain any of the following:
NB-IoT Primary Synchronization Sequence (NPSS);
NB-IoT Secondary Synchronization Sequence (NSSS);
NB-IoT Physical Broadcast Channel (NPBCH); and
NB-SIB1.

10. The method according to claim 8, wherein the first subframe is indicated by the Paging Occasion subframe table to be a starting subframe of Narrowband Physical Data Control Channel (NPDCCH) repetitions.

11. The method according to claim 10, wherein the CSS is defined only over valid downlink subframes, such that when the NPDCCH repetition overlaps with an invalid downlink subframe, the NPDCCH repetition is delayed until a next valid downlink subframe.

12. The method according to claim 8, wherein the network node transmits a valid downlink subframe pattern in a System Information Block (SIB) message broadcast to the UE.

13. A user equipment (UE) configured for determining common search space (CSS) for Narrowband Internet of Things (NB-IoT) paging while operating in idle mode, the UE comprising:
    processing circuitry configured to:
        monitor a starting subframe of the CSS for a Radio Network Temporary Identifier (RNTI);
        wherein the starting subframe of the CSS is determined as follows:
            use a first subframe (SF0), according to a Paging Occasion subframe table, when the first subframe is determined, based on a received bitmap, to be a valid downlink subframe; and
            use a next valid downlink subframe after the first subframe when the first subframe is determined to be an invalid downlink subframe.

14. The UE according to claim 13, wherein the processing circuitry is configured to determine a subframe is a valid downlink subframe if:
    the subframe is indicated as a valid downlink subframe in a Narrowband System Information Block 1 (NB-SIB1); and
    the subframe does not contain any of the following:
        NB-IoT Primary Synchronization Sequence (NPSS);
        NB-IoT Secondary Synchronization Sequence (NSSS);
        NB-IoT Physical Broadcast Channel (NPBCH); and
        NB-SIB1.

15. The UE according to claim 13, wherein the first subframe is indicated by the Paging Occasion subframe table to be a starting subframe of Narrowband Physical Data Control Channel (NPDCCH) repetitions.

16. The UE according to claim 15, wherein the CSS is defined only over valid downlink subframes, such that when the NPDCCH repetition overlaps with an invalid downlink subframe, the NPDCCH repetition is delayed until a next valid downlink subframe.

17. The UE according to claim 13, wherein the processing circuitry is configured to determine a subframe is a valid downlink subframe based on a valid subframe pattern received in a System Information Block (SIB) message broadcast by a network node.

18. The UE according to claim 13, wherein the processing circuitry is configured to determine a subframe is a valid downlink subframe based on a valid subframe pattern, the valid subframe pattern comprising subframes not occupied by known broadcast channels or broadcast signals.

19. The UE according to claim 13, wherein the processing circuitry is configured to determine a subframe is a valid downlink subframe based on a first valid subframe pattern and a second valid subframe pattern;
    the first valid subframe pattern being a downlink subframe pattern received in a System Information Block (SIB) message broadcast by a network node; and
    the second valid subframe pattern comprising subframes not occupied by known broadcast channels or broadcast signals.

20. A network node configured for determining common search space (CSS) for Narrowband Internet of Things (NB-IoT) paging, the network node comprising:
    processing circuitry configured to:
        transmit a paging message to a user equipment (UE), the paging message beginning with a starting subframe of the CSS;
        wherein the starting subframe of the CSS is determined as follows:
            use a first subframe (SF0), according to a Paging Occasion subframe table, when the first subframe is determined, based on a received bitmap, to be a valid downlink subframe; and
            use a next valid downlink subframe after the first subframe when the first subframe is determined to be an invalid downlink subframe.

21. The network node according to claim 20, wherein the processing circuitry is further configured to:
    determine a subframe is a valid downlink subframe if the subframe does not contain any of the following:
        NB-IoT Primary Synchronization Sequence (NPSS);
        NB-IoT Secondary Synchronization Sequence (NSSS);
        NB-IoT Physical Broadcast Channel (NPBCH); and
        NB-SIB1; and
    indicate the subframe as a valid downlink subframe in System Information Block 1 (SIB1).

22. The network node according to claim 20, wherein the first subframe is indicated by the Paging Occasion subframe table to be a starting subframe of Narrowband Physical Data Control Channel (NPDCCH) repetitions.

23. The network node according to claim 22, wherein the CSS is defined only over valid downlink subframes, such that when the NPDCCH repetition overlaps with an invalid downlink subframe, the NPDCCH repetition is delayed until a next valid downlink subframe.

24. The network node according to claim 20, wherein the processing circuitry is further configured to transmit a valid subframe pattern in a System Information Block (SIB) message broadcast to the UE.

\* \* \* \* \*